United States Patent [19]

Smith

[11] 4,009,488
[45] Feb. 22, 1977

[54] VIDEO DISPLAY SYSTEM AND METHOD EMPLOYING PROPAGATING STRESS WAVES

[76] Inventor: Ronald S. Smith, CMR Box 2509 USASAFS Augsburg, A.P.O. New York, N.Y. 09458

[22] Filed: May 1, 1975

[21] Appl. No.: 573,611

[52] U.S. Cl. .......................... 358/62; 178/DIG. 18; 350/149; 350/161 S; 358/61; 358/232
[51] Int. Cl.² .......................... H04N 9/31; G02F 1/11
[58] Field of Search ................ 178/7.3 D, DIG. 18; 358/62; 350/161, 149

[56] References Cited

UNITED STATES PATENTS

| | | | |
|---|---|---|---|
| 2,509,545 | 5/1950 | Walton | 178/7.3 D |
| 3,562,414 | 2/1971 | Blum | 178/7.3 D X |
| 3,637,288 | 1/1972 | Seidel | 350/161 X |
| 3,836,712 | 9/1974 | Kornreich et al. | 178/7.3 D X |
| 3,860,752 | 1/1975 | Adler et al. | 358/62 X |

Primary Examiner—Benedict V. Safourek
Assistant Examiner—Mitchell Saffian
Attorney, Agent, or Firm—Burns, Doane, Swecker & Mathis

[57] ABSTRACT

A scanned video display system in which a stress wave propagating medium forms a viewing plane and scanning is accomplished in a first scanning direction by stress waves propagated along the medium, while scanning in a second scanning direction is accomplished by emitting light along a scan line in the second direction. The light emitted along the scan line in the second direction is modulated in intensity by a video signal and is incident upon each of the stress waves over the extent of the viewing plane so as to produce a video modulated beam of light scanned in the two dimensions or directions of the viewing plane. In one embodiment, the emitted light is polarized in a first direction and passes through the stress wave propagating medium. The light is again polarized after passing through the medium but in a direction orthogonal to the first direction. In another embodiment, a surface of the medium is reflective and the emitted light is parallel to the reflective surface of the medium such that the light strikes the propagated wave and is reflected away from the surface of the medium. A color embodiment and parallel output feature are also disclosed.

19 Claims, 7 Drawing Figures

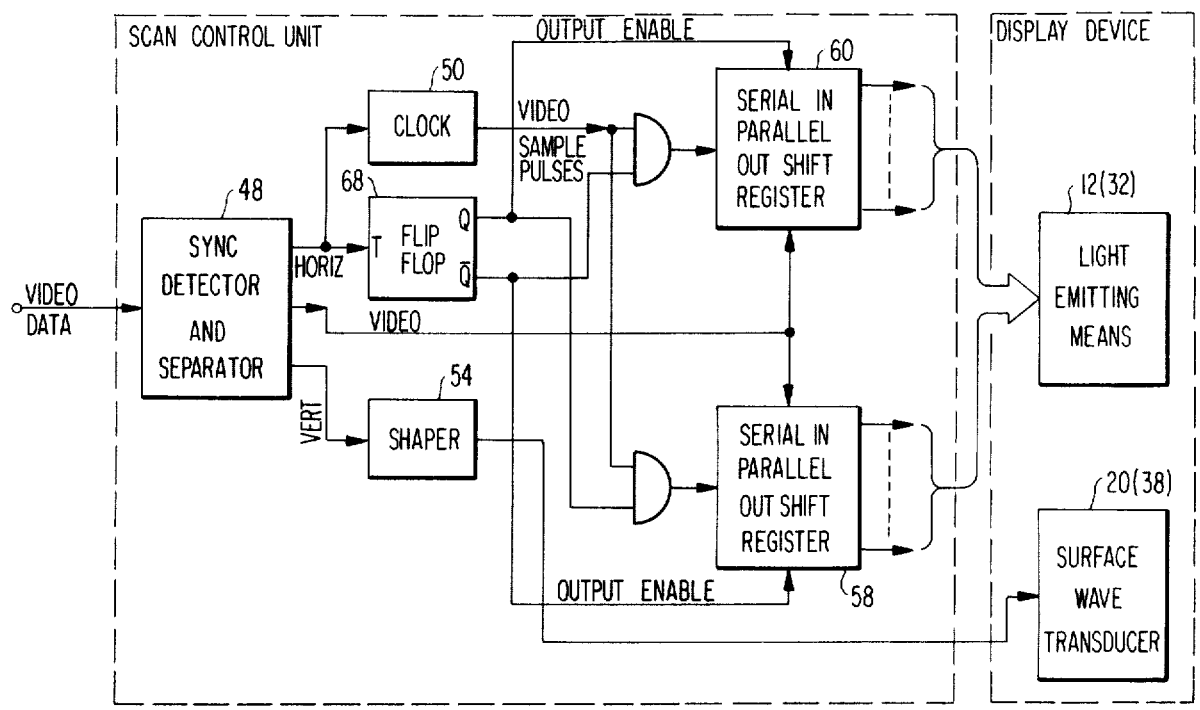
FIG.5
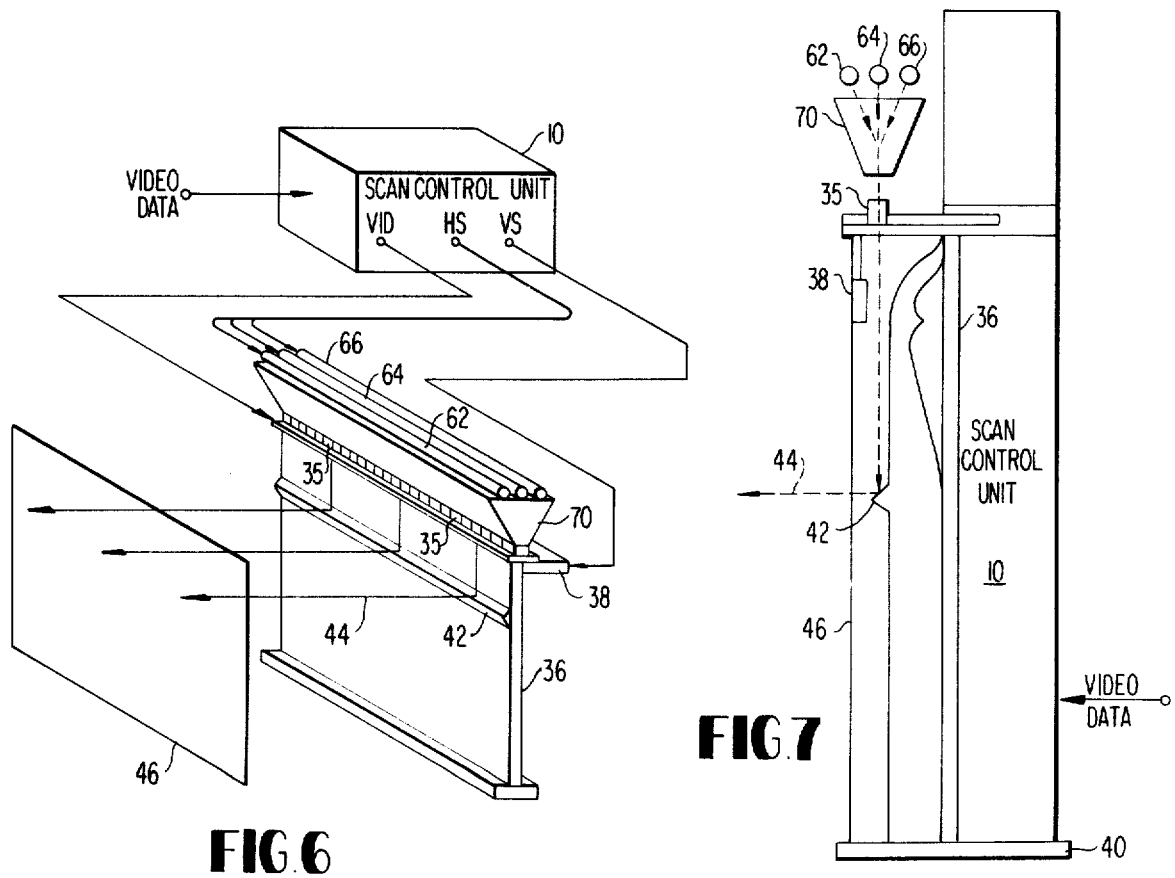
FIG.6
FIG.7

VIDEO DISPLAY SYSTEM AND METHOD EMPLOYING PROPAGATING STRESS WAVES

BACKGROUND OF THE INVENTION

This invention relates to video display systems and, more particularly, to a video display system and scanning method employing propagating stress waves and light emitting means for scanning a viewing plane in orthogonal scanning directions.

In a typical video display system such as that employed in television receivers, a raster scan technique is employed and a beam of electrons is scanned horizontally and vertically through deflection of the electron beam. As the electron beam is scanned, the beam is modulated by a video signal so as to vary the intensity of the beam proportionately to the amplitude of the video signal. The scanned and video modulated electron beam strikes a phosphor coating on a screen element and excites the phosphor in relation to its intensity. The scanning speed is such that a viewer sees an entire image made up of light and dark areas on the screen element without being aware of the scanning which transpires.

Electron beam scanning techniques typically employ evacuated cathode-ray tubes which may be quite large and cumbersome because of the electron beam deflection requirements. The cathode-ray tubes are usually quite expensive both because of the size requirements and because of the internal complexity thereof. Accordingly, numerous attempts have been made to simplify such display systems.

One attempt to simplify video display systems involves the use of solid state devices and what may be termed electro-optical scanning techniques. For example, it has been suggested that scanning may be accomplished in a video display by propagating accoustic energy along a strain responsive semiconductor material in orthogonal directions and by illuminating the entire back surface of the material with intensity modulated light. Stress waves propagating both vertically and horizontally in the semiconductor material selectively modify the light waves passing through the material and a scanning function of sorts is accomplished by an increase in the percentage of light transmitted through the semiconductor material in the region of the intersection of the vertically and horizontally propagating waves.

The propagation velocity of the stress waves in homogenous semiconductor materials is typically quite high and is usually constant independently of the direction of propagation in the material. Therefore, if the scanning period, i.e., the period between successive scanning synchronization signals, is about the same in both the horizontal and vertical directions and is relatively short, this technique may be utilized in a video display device of relatively manageable dimensions. However, in a raster scan system the vertical scanning period is several hundred times as long as the horizontal scanning period. Employing this suggested scanning technique in a raster scan display employing a homogenous stress wave propagating material therefore is impractical, for common standards. Moreover, the selection of the stress wave propagating material is cricital since it must exhibit appropriate light modifying characteristics only at the intersection of two orthogonal stress waves.

OBJECTS AND SUMMARY OF THE INVENTION

It is accordingly an object of the present invention to provide a novel video display system suitable for use with raster scan techniques.

It is a further object of the present invention to provide a novel video display device and method employing propagating stress waves for scanning a light beam in only one scanning direction.

It is another object of the present invention to provide a novel method display device scanning system wherein entire lines of video information may be displayed so as to reduce the circuit response times and increase light output.

It is yet another object of the present invention to provide a novel video displae which is extremely compact and is compatible with existing television raster scan systems.

It is a further object of the present invention to provide a novel video display device wherein very large screen sizes are practical.

These and other objects and advantages of the present invention are accomplished through the provision of a video display system comprising a stress wave propagating means defining a viewing plane and including means for initiating the propagation of stress waves along the propagating means in a first scanning direction in the viewing plane. A light emitting means is disposed to emit light along a scan line in a second scanning direction generally perpendicular to the first scanning direction. The light emitting means is disposed in relation to the stress wave propagating means to emit light incident upon each of the stress waves propagated along the propagating means over the extent of the viewing plane in the first scanning direction so that the emitted light interacts with the propagated stress waves over an entire scanning interval in the first scanning direction and so that the light emitted along the scan line in the second scanning direction is scanned in the first scanning direction over the entire viewing plane by the stress waves. The emitted light is selectively modulated in intensity by a video signal resulting in the display of an image in the viewing plane.

In accordance with one embodiment of the invention, the stress wave propagating means is transparent and the light emitting means is disposed to emit light through the propagating means. A first sheet of transparent polarized material is disposed intermediate the propagating means and the light emitting means and has a polarization axis disposed to linearly polarize light passing therethrough in a first polarization direction. A second sheet of transparent polarized material is disposed in the path of light passing through the first sheet and propagating means and has a polarization axis disposed perpendicular to the polarization axis of the first sheet. In the preferred form of this embodiment, light emitted by the light emitting means is linearly polarized by the first sheet of transparent polarized material and passes through the stress wave propagating means unaffected, except in the vicinity of the propagating stress wave. Since the unaffected light is linearly polarized, it cannot pass through the second sheet of polarized material because of the orthogonal orientation of its polarization axis. However, the linearly polarized light interacting with the propagating stress wave becomes elliptically polarized and therefore passes through a second sheet of polarized material providing an emerging video modulated scanned light beam which is scanned in the first scanning direction by the propagated stress wave.

In accordance with another embodiment of the invention, the stress wave propagating means comprises a surface wave propagating medium and surface waves are propagated along a planar surface of the medium. The surface of the medium along which surface waves are propagated is light reflective over at least the area of the viewing plane and the light emitting means is disposed to emit light parallel to the planar surface of the medium so that the emitted light strikes the propagated wave and is reflected away from the planar surface by the propagated surface waves. Means such as a glare reduction filter is disposed in the path of the light reflected away from the light reflective surface of the medium so that the emitted and reflected light passes through the filter and ambient light directed toward the reflective surface of the medium is blocked by the filter.

In accordance with the preferred form of the invention, the light emitting means comprises a plurality of individually controllable light sources operable to define a selectively modulated line of light in the horizontal scanning direction of the display. The stress waves are propagated in the vertical scanning direction of the display. Scanning is accomplished by individually controlling the light from the light sources in accordance with a video signal and a horizontal scan signal and by propagating the stress waves in response to a vertical scan signal synchronized with the horizontal scan signal.

In one form of the invention the video signal is sampled and stored to provide video information defining the intensity modulation of one scan line. The stored video information for one entire scan line is then utilized to modulate the light from the light emitting means while video information is being sampled and stored for the next scan line. Required circuit response times can thus be decreased while increasing light output.

Further objects and advantages of the present invention will become apparent to one skilled in the art to which the invention pertains from the following detailed description when read in conjunction with the appended drawings.

BRIEF DESCRIPTION OF THE DRAWINGS

FIG. 5 is a functional block diagram illustrating a second embodiment of the scan control unit of FIGS. 1 and 3;

FIG. 6 is a schematic exploded representation of a color display embodiment of the present invention; and, FIG. 7 is a view in elevation of an assembled color flat screen display device of the embodiment of FIG. 6.

DETAILED DESCRIPTION

Figure 1:
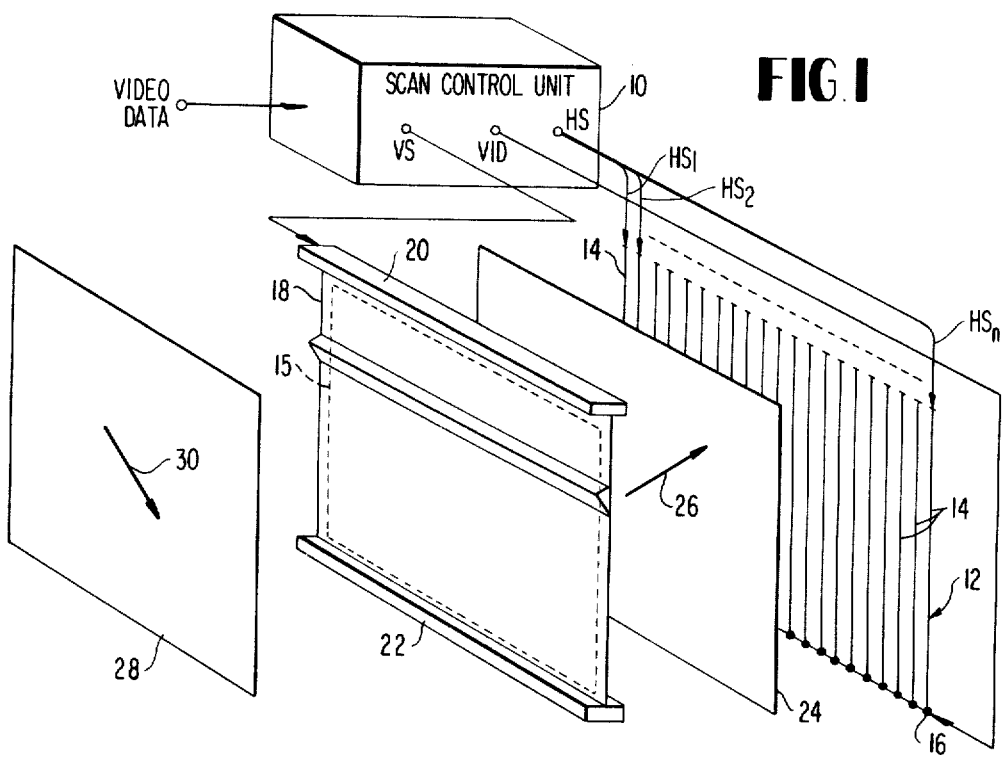
FIG. 1 is a schematic exploded representation of one embodiment of a display in accordance with the present invention.

Referring to FIG. 1 in which a first embodiment of the invention is illustrated, video information and synchronization information is supplied to a scan control unit 10 described hereinafter in greater detail. In the illustrated embodiment described herein, the display device is employed to provide a raster scan display and the video data may accordingly contain a video signal, a horizontal synchronization (sync) signal and a vertical sync signal. The scan control unit 10 may separate the video data signal into its various components in any suitable conventional manner and provide a video data signal VID, a horizontal scan signal HS, and a vertical scan signal VS suitable for controlling scanning in accordance with the present invention as is described hereinafter.

The video signal VID from the scan control unit 10 may be supplied to a suitable light emitting means generally indicated at 12. In the embodiment of FIG. 1, the light emitting means 12 preferably receives the horizontal scan signal HS and is disposed to provide a horizontal scanning function along scan lines in the horizontal scanning direction as will hereinafter be described in greater detail.

In this connection, the light emitting means 12 may comprise a plurality of individually controllable light sources 14 each extending vertically over one dimension of a viewing plane indicated in phantom at 15. Together, the light sources 14 also extend over an orthogonal dimension of the viewing plane 15 and define a scan line in the horizontal scanning direction. For example, each of the light sources 14 may comprise a vertically disposed strip of light emitting material such as a plasma glow discharge device at least coextensive with the vertical dimension of the viewing plane. The light sources 14 may be spaced in accordance with the desired resolution of the display in the horizontal scanning direction.

Each of the individual light sources 14 may be connected together at one end to a common terminal 16 and the video signal VID from the scan control unit 10 may be supplied to the common terminal 16. The horizontal scan signal HS from the scan control unit 10 may be supplied to the individual light sources 14 to control the energization thereof as will hereinafter be described in greater detail.

A vertically disposed transparent screen element 18 including a sheet of transparent stress wave propagating material is disposed in the path of the light emitted by the light emitting means 12. A suitable conventional stress wave transducer 20 at one end of the screen element 18 is arranged to initate the propagation of stress waves preferably along a planar surface of the propagating medium forming the screen element 18 in the vertical scanning direction in response to the vertical scan signal VS from the scan control unit 10. A suitable damper 22 for damping the stress waves traversing the screen element 18 may be provided at the other end of the screen element 18 so as to prevent reflection the stress waves after they have propagated across the viewing plane 15 in the vertical scanning direction.

A first sheet of transparent polarized material is disposed intermediate the screen element 18 and light emitting means 12. The polarized material 24 has an axis of polarization generally indicated at 26. The axis of polarization 26 is preferably disposed in a direction which will generally maximize the photoelastic light switching effect (e.g., at approximately 45° to the scanning axis) so as to linearly polarize the light from the light emitting means 12 in a first polarization direction, e.g., linearly polarize the light at an angle of 45° to the vertical scanning direction. A second sheet of transparent polarized material 28 is disposed on the side of the screen element 18 opposite the first sheet 24 so that light from the sources 14 passing through the polarized sheet 24 and the screen element 18 is incident upon the polarized sheet 28. The polarization axis 30 of the sheet 28 is disposed perpendicular to the polarization axis 26 of the sheet 24.

The stress wave propagating medium is preferably a single thickness sheet of transparent material of a type suitable for propagating surface waves, also referred to as Rayleigh waves. Such waves are discussed in an article entitled "Elastic Surface Waves," *Physics Today*, Nov. 1972, pp. 32–39 and in *Stress Waves in Solids* by H. Kolsky at pp. 16–23. In the illustrated embodiment, the surface wave propagating material or medium forming the planar surface of the screen element 18 may be any suitable conventional medium having physical characteristics appropriate for the scanning function provided. In the illustrated embodiment, propagation of surface waves along the planar surface of the surface wave propagating medium provides the vertical scanning function of the display. The medium therefore has a propagation velocity constant and a vertical extent such that a surface wave traverses the viewing plane in the period between successive vertical sync pulses.

For example, the screen element 18 may be formed of a sheet of transparent, birefringent, isotropic elastomer which exhibits a surface stress wave velocity of 26 meters per second (an elastomer Rayleigh wave velocity given in the referenced Kolsky publication). The thickness of a material is preferably a few wavelengths greater than the wavelength of the propagating wave so that the propagating medium is essentially nondispersive, i.e. the surface wave maintains its shape over the scanning region defined by the viewing plane and is for practical purposes unattenuated.

Assuming, for example, that the propagation velocities of appropriate elastomers vary between 25 m/sec. and 40 m/sec., and that the period between successive vertical sync pulses is 20 milliseconds, then the vertical extent of the resulting screen element would vary between 0.5 and 0.8 meters. Thus very large screen sizes are practical.

Figure 2:
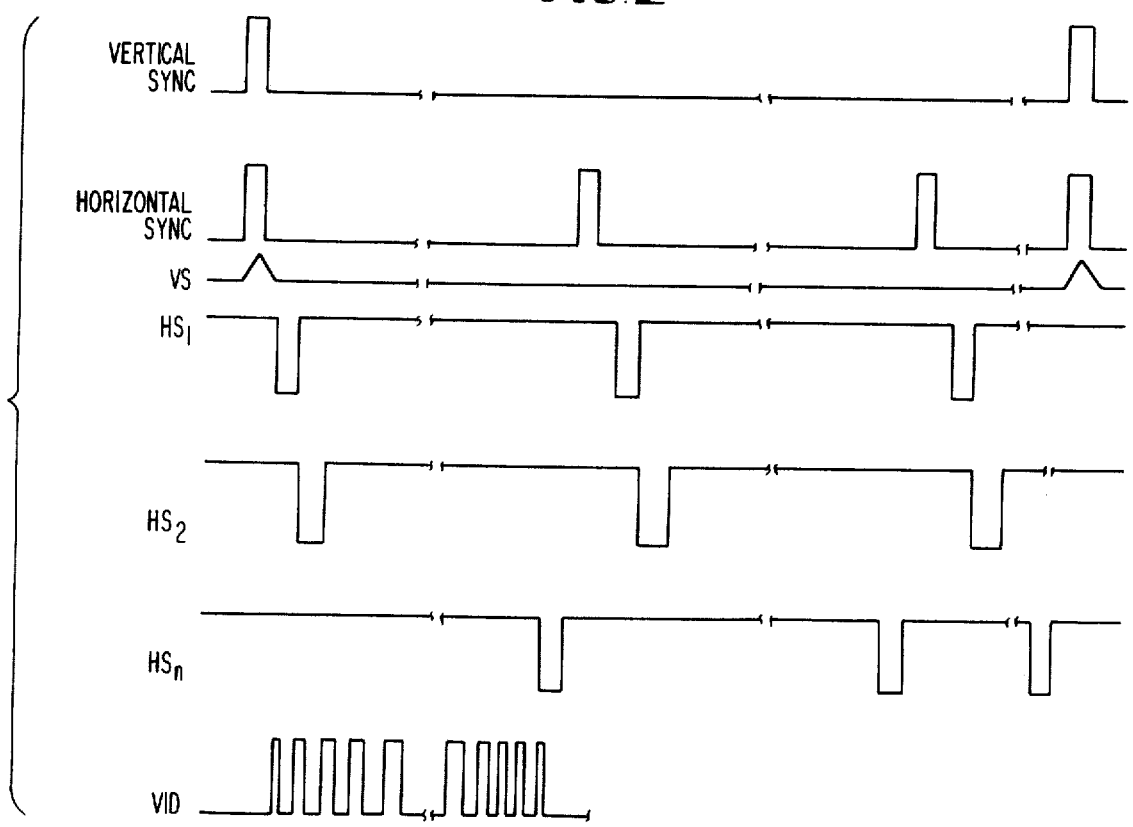
FIG. 2 is a graphical illustration of various waveforms supplied to and from the scan control unit of FIG. 1.

The operation of the embodiment of the invention illustrated in FIG. 1 may be more clearly understood with reference to the waveforms graphically illustrated in FIG. 2. Reffering now to FIGS. 1 and 2, the vertical scan signal VS, from the scan control unit 10 initiates the propagation of a surface wave along the surface of the screen element 18 at the start of each scanning cycle or frame. The horizontal scan signal HS enables each of the light sources 14 in a predetermined sequence preferably in sequencial order from the left-most to the right-most source. The light sources are thereby scanned, in effect, in accordance with the normal horizontal scan of a raster display.

The intensity of the light emitted by the light sources is also modulated in accordance with the video signal as the sources are scanned horizontally. The video signal VID energizes the light source enabled by the horizontal scan signal HS and light source enabled at any one instant emits light in proportion to the amplitude of the video signal. This may be accomplished by duty cycle modulation of the light sources 14 or in any other suitable conventional manner. For example, the video information contained in the video data signal may be sampled and the video signal VID supplied to the light sources 14 may be a series of pulses each corresponding to a particular location in the horizontal scanning pattern of the display and each related in duration to the amplitude of the video signal at that location. In any event, the light sources 14 emit an entire horizontal scan line of video modulated light during each interval between successive horizontal synchronization signals.

The emitted light is polarized by the transparent sheet 24 and, in the illustrated embodiment, vertically polarized light strikes the screen element 18. If the vertically polarized light passes through the screen element 18 unchanged, the polarized sheet 28 blocks the vertically polarized light because of the orientation of its axis of polarization. However, the vertically polarized light passing through the screen element 18 through a propagating surface wave interacts with the propagating surface wave and emerges from the screen element 18 changed in polarization.

For example, in the FIG. 1 embodiment of the invention the interaction of the emitted light with the propagating surface wave causes the light to become elliptically polarized. Because of this change in polarization of the light incident upon the surface wave propagating along the screen element 18, the polarized sheet 28 passes light at the intersection of the propagating surface wave and the enabled light source. As a result, a video modulated, horizontally and vertically scanned light beam emerges from the display device.

Figure 3:
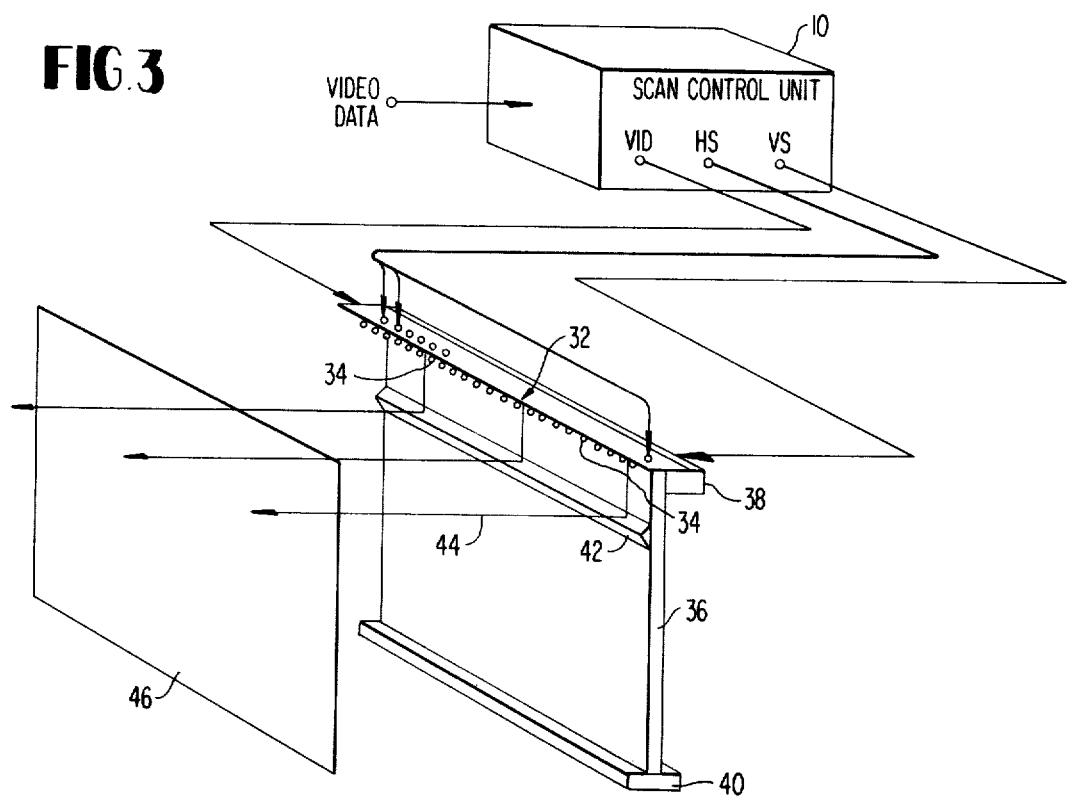
FIG. 3 is a schematic exploded representation of a second embodiment of a display in accordance with the present invention.

Referring now to FIG. 3 wherein another embodiment of the present invention is illustrated, the scan control unit 10 described previously may supply the video signal VID to a common input terminal of a suitable light emitting means generally indicated at 32. In the FIG. 4 embodiment, the light emitting means 32 comprises a plurality of individually controllable point light sources 34 such as light emitting diodes. The light sources 34 are disposed to provide a horizontal scanning function and the horizontal scan signal HS may be supplied to the individual light sources 34 to scan the light sources along scan lines in the horizontal direction as described previously in connection with the FIG. 1 embodiment.

The screen element of the FIG. 3 embodiment preferably comprises a vertically disposed sheet of material of a suitable stress wave propagating medium 36 such as the surface wave propagating material previously described in connection with FIG. 1. The planar surface of the medium 36 may be provided with a reflective coating, e.g. may be silvered, or the medium itself may be reflective rather than transparent as in the FIG. 1 embodiment. A suitable conventional surface wave transducer 38 may be arranged at one end of the medium 36 to initiate the propagation of surface waves along the surface of the medium 36 in the vertical scanning direction, and a suitable surface wave damper 40 may be provided at the other end of the medium to prevent wave reflection.

The light emitting sources 34 are disposed to emit light along a horizontal scan line of the display so that the emitted light is incident upon a surface wave 42 traveling along the planar surface of the medium. Specifically, the light emitted from the sources 34 strikes a surface of the propagated surface wave 42 and, because of the reflective properties of the surface, is reflected away from the surface as indicated at 44.

A suitable conventional glare reduction filter 46 is disposed adjacent the screen element in the path of light reflected therefrom. The glare reduction filter permits emitted light 44 reflected from the surface of the medium 36 to pass while blocking ambient light which might otherwise enter the display device and be reflected back toward the viewer from the reflective surface of the screen element.

The operation of the FIG. 3 embodiment is similar to that of the FIG. 1 embodiment and may be understood both with reference to FIGS. 2 and 3. Referring now to FIGS. 2 and 3, the vertical sync signal may be shaped by the scan control unit 10 to provide a triangular vertical scan signal VS. The vertical scan signal VS supplied to the transducer 38 initiates the propagation of an essentially triangular surface wave along the reflective surface of the medium 36.

Simultaneously with the propagation of the surface wave along the surface wave medium 36, the horizontal scan signal $HS_1$-$HS_n$ successively enables the light emitting sources 34 and video signal VID controls the intensity of the enabled sources in accordance with the video information. A video modulated horizontally scanned light beam is accordingly emitted parallel to the reflective surface of the medium 36 and strikes the surface wave propagating along the surface of the medium.

Since the medium 36 is nondispersive, the propagating surface wave maintains its triangular shape over the vertical extent of the medium and provides, in effect, a vertically propagating mirror from which the horizontally scanned, video modulated light beam is reflected outwardly through the glare reduction filter 46. As a result of the interaction between the light beam and the surface wave, a video modulated beam of light scanned both horizontally and vertically emerges from the display device.

As is previously mentioned, the scan control unit 10 may be any suitable conventional circuit for supplying the signals illustrated in FIG. 2 from television or other video input data. For example, with reference to FIG. 4, wherein one embodiment of the scan control unit 10 is functionally illustrated, the video data may be supplied to a conventional sync detector and separator such as that employed in a television receiver. The horizontal sync signal HORIZ from the sync detector and separator 48 is supplied to a suitable conventional clock signal generator 50 to synchronize the clock signal CL therefrom with the horizontal sync pulses. The video signal VIDEO from the sync detector and separator 48 is supplied to the data input terminal of the suitable conventional pulse width modulator 52 and the vertical sync signal VERT from the sync detector and separator 48 is supplied to a suitable conventional shaper circuit 54.

The clock signal CL from clock circuit 50 is supplied to the clock input terminal of the pulse width modulator 52 and to a conventional counter and decoder circuit 56. The counter and decoder circuit 56 supplies the horizontal scan signals $HS_1$-$HS_n$ to the individual light sources of the light emitting means 12 (32) of the display device and the pulse width modulator 52 supplies the VID signal to the common terminal of the light emitting means. The vertical sync signal VERT is shaped by the shaper 54 and supplied to the surface wave transducer 20 (38).

In operation, the sync detector and separator 48 separates the horizontal and vertical sync signals from the video data in a conventional manner. The clock 50 is synchronized by the horizontal sync pulses HORIZ and supplies a series of clock pulses in the interval between successive horizontal sync pulses. The frequency of the clock pulses determines the horizontal resolution of the display and therefore may be selected as desired in accordance with the horizontal extent of the display and the desired resolution.

The clock signal CL is supplied to the counter and decoder circuit 56 and each pulse of the clock signal is counted. The count in the counter at any particular time is decoded in a conventional manner, e.g. by a binary to decimal decoder, to supply the horizontal scan signals $HS_1$-$HS_n$. For example, the $HS_1$ signal may be generated in response to the count of one in the counter. The $HS_n$ signal may be generated at some later time in response to a count of n in the counter counting the clock pulses. The $HS_1$-$HS_n$ signals are therefore successively generated to enable the individual light sources of the light emitting means 12 (32) in accordance with a desired scanning sequence. Alternatively, a shift register may be employed for this purpose thus eliminating the need for a counter and decoder.

The pulse width modulator 52 transforms the video signal to supply the VID signal to the light emitting means. For example, the pulse with modulator 52 may be any suitable conventional circuit which samples the video signal in response to the pulses of the clock signal CL. The amplitude of the sample video signal may then be represented by the duration of a pulse, i.e. the video signal may be represented by a pulse width modulated signal. Since the pulse width modulator 52 and the counter and decoder 56 are both controlled by the clock signal CL, the light emitting means is scanned and supplied with the video signal in synchronism.

The shaper 54 shapes the vertical sync pulses to provide the desired shape vertical scan signal VD. For example, a triangular wave shape is desired in accordance with the present invention so that a triangular surface wave is initiated by the surface wave transducer 20 (38). Accordingly, the shaper 54 may be any suitable conventional circuit for converting a pulse signal into a triangular shaped signal. Moreover, while the vertical sync signal is synchronized with the horizontal sync signal, the horizontal and vertical scan signals HS and VD may experience slightly different delays in the generation thereof. Accordingly, one or both of these signals may be appropriately delayed to ensure synchronization therebetween and with respect to the video signal VID.

In accordance with the foregoing embodiments of the invention, the light emitting means 12 (32) are disposed along the length of a scan line lying in the horizontal scanning direction so that the light periodically emitted therefrom is incident upon the surface waves propagated in the vertical direction over the extent of the viewing plane (i.e. throughout each vertical scanning interval between successive vertical scan pulses). The screen element may be rotated 90° so that the vertical and horizontal directions are reversed, but the principles of operation remain the same.

Moreover, the light emitting means need not be periodically energized on an individual basis. For example, rather than scanning the light emitting means on an individual basis in the horizontal direction, an entire horizontal scan line of video information may be supplied to the light emitting means and the light emitting means may be enabled during each horizontal scanning period while this entire line of video information is present.

One way in which this may be accomplished is illustrated functionally in FIG. 5. Referring to FIG. 5, the circuitry of the scan control circuit 10 may be similar to that described in connection with FIG. 4 with the exception of two additional serial in-parallel out shift registers 58 and 60. The video signal may be clocked into one of the shift registers 58 or 60 by the clock signal CL from the clock 50. The output of the store/readout flip-flop (68) is used to read an entire line of video data stored in one of the registers and the entire contents of that register may be applied to the appropriate light sources which form the light emitting means 12 (32), while the succeeding horizontal scan line of video data is simultaneously stored in the other shift register. The selections of the registers for alternate storing and readout of video data is controlled by a conventional switch 68 toggled by the horizontal sync pulses.

The shift registers 58 and 60 may be binary shift registers if the light is to be modulated by only two levels of video information (e.g., if only black and light shades are required for the display). An analog shift register or other suitable means may be provided to preserve the intermediate shades or to provide, in conjunction with arrays of three colored light sources and individually modulatable light valves (e.g., liquid crystals or other suitable means), colored light intensity modulated video images.

For example, FIGS. 6 and 7 illustrate an embodiment in accordance with the invention for providing colored intensity modulated video images. Referring now to FIGS. 6 and 7 wherein numerical designations previously utilized in connection with FIG. 3 indicate like elements, a scan control circuit 10 identical to that described in connection with FIG. 5 may be connected to the display as illustrated.

In accordance with the illustrated color embodiment of the invention, high efficiency colored light emitting means such as red light emitting means 62, blue light emitting means 64 and green light emitting means 66 may be disposed along the length of a scan line lying in a horizontal scanning direction. Means such as fiber optic light condenser 70 may direct light from the light emitting means 62, 64 and 66 through a plurality of light valves 35 such that the light periodically emitted from the light valves is incident upon a surface wave 42 propagating in the vertical direction over the extent of the viewing plane (i.e., throughout each vertical scanning interval between successive vertical scan pulses).

The light emitting means 62, 64 and 66 may be sequentially operated in a continuous mode in response to the signal HS to provide respective color field periods. Specifically, the light emitting means 62, 64 and 66 may be sequentially energized for predetermined time periods to provide, for each horizontal scan line, a color field which is intensity modulated by the light valves 35. All three light emitting means may thus be energized in sequence as the data relating to the corresponding color is used to modulate light intensity.

Storing of the video analog data, as well as control of the operation of the light emitting means, during respective color field periods, may be effected according to the state of a convention three-state counter and decode gates (not shown). Video analog data (red, blue and green) is stored in sequence in one of the shift registers 58 or 60 as the preceding horizontal line of data is read out from the other shift register and supplied to the light valves 35 as the VID signal. The shift register selection for storing and reading is controlled by switch 68 which may be toggled by the horizontal sync pulses.

Intensity modulation of the light emitted is accomplished through the use of the light valves 35 (e.g., liquid crystal chips). The light valves 35 may be disposed along the length of a scan line lying in a horizontal scanning direction to control the light passing through the fiber optic light condenser 70. For example, during a horizontal scan line period when an entire line of video data is being stored by one of the shift registers, the horizontal scan line signal $HS_n$ may be used to read the previously stored contents of the other shift register for application to the appropriate light valves 35. The conventional three-state counter and decode gates may simultaneously enable the appropriate colored light source so that an entire horizontal line of video modulated colored light emerges from the light valves 35. The light emitting means 62, 64 and 66 may thus be enabled successively in synchronism with the reading of the color intensity data to provide a field sequential color scan.

Figure 4:
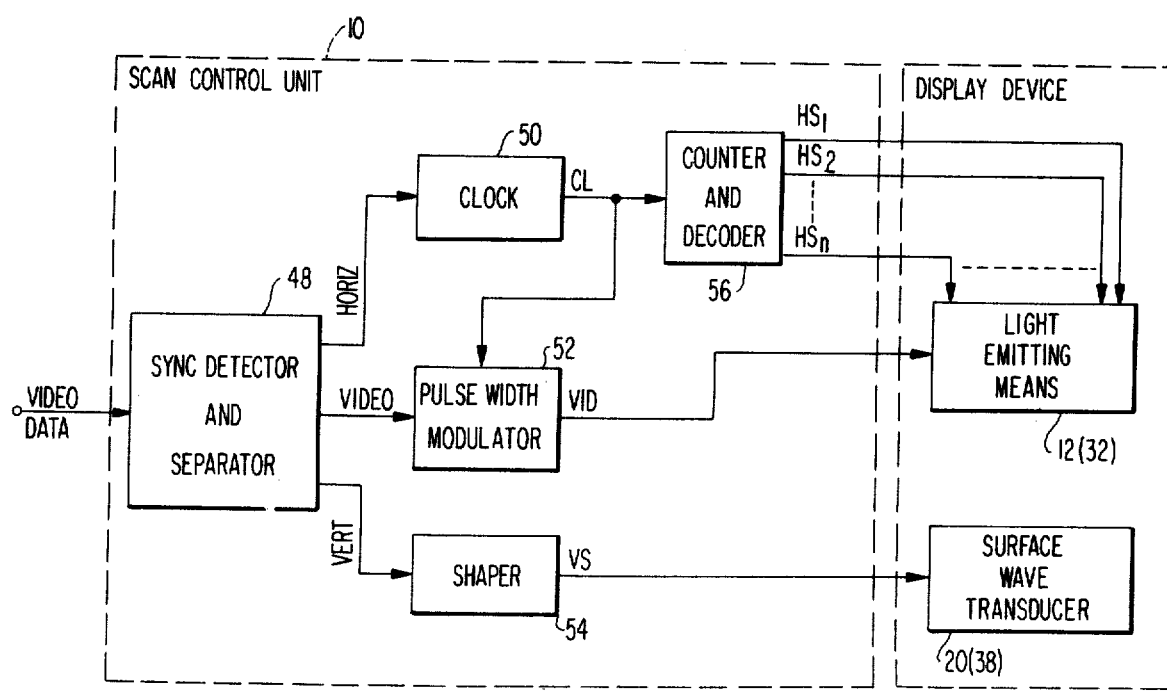
FIG. 4 is a functional block diagram illustrating one embodiment of the scan control unit of FIGS. 1 and 3.

The foregoing embodiment of the invention illustrated in FIG. 6 may also be operated with a scan control circuit 10 which may be identical to that described in connection with FIG. 4. FIG. 7 illustrates a partial side view of the color flat screen display device of the embodiment of FIG. 6 and wherein the entire unit including the scan control unit 10 may be combined in one compact enclosure.

The present invention may be embodied in other specific forms without departing from the spirit or essential characteristics thereof. The presently disclosed embodiments and therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A video display system comprising:
 a stress wave propagating means defining a viewing plane and including means for initiating the propagation of stress waves along said propagating means in a first scanning direction in said viewing plane; and
 means for emitting light selectively modulated in intensity by a video signal along a scan line in a second scanning direction generally perpendicular to said first scanning direction, said light emitting means being disposed in relation to said stress wave propagating means to emit light incident upon each of said stress waves propagated along said propagating means over the extent of the viewing plane in said first scanning direction so that the emitted light interacts with said propagated stress waves over a scanning interval in said first scanning direction and so that the light emitted and selectively modulated along said scan line in said second scanning direction is scanned in said first scanning direction over said viewing plane by said propagated stress waves.

2. The system of claim 1 wherein said stress wave propagating means is transparent and said light emitting means is disposed to emit light through said propagating means, said system including:
 a first sheet of transparent polarized material disposed intermediate said propagating means and said light emitting means and having a polarization axis disposed to linearly polarize light passing therethrough in a first polarization direction;
 a second sheet of transparent polarized material disposed in the path of light passing through said first sheet and said propagating means and having a polarization axis disposed perpendicular to said polarization axis of said first sheet.

3. The system of claim 1 wherein said stress wave propagating means comprises a surface wave propagating medium and wherein said initiating means initiates the propagation of surface waves along a planar surface of said medium, said planar surface of said medium along which said surface waves are propagated being light reflective over at least the area of said viewing plane, said light emitting means being disposed to emit light parallel to said planar surface of said medium in spaced relation thereto so that said emitted light strikes said propagated surface waves and is reflected away from said planar surface by said propagated surface waves.

4. The system of claim 3 including means disposed in the path of light reflected away from said light reflective surface of said medium for passing emitted light reflected from said light reflective surface and for blocking ambient light directed toward said light reflective surface of said medium.

5. The system of claim 1 wherein said light emitting means comprises:
 means for selectively emitting red, green and blue light in a continuous mode to provide a field sequential color scan line in a second scanning direction generally perpendicular to said first scanning direction;
 means for intensity modulating said selectively emitted red, green and blue light in response to a video signal.

6. The system of claim 5 wherein said means for intensity modulating said selectively emitted red, green and blue light comprises an optical fiber condenser which directs said selectively emitted red, green and blue light through a plurality of individually controllable light valves operable to define a selectively modulated line of light in said scanning direction in response to a video signal.

7. The system of claim 6 wherein said light valves are liquid crystal chips.

8. The system of claim 1 wherein said light emitting means comprises:
 a plurality of individually controllable light sources operable to define a selectively modulated line of light in said second scanning direction; and,
 means for intensity modulating light from said light sources in response to a video signal.

9. The system of claim 8 wherein said modulating means comprises:
 means responsive to said video signal for generating a digital signal containing video information in the form of pulse modulation; and,
 means for selectively applying individual pulses of said digital signal to said light sources on the basis of time of occurrence of said pulses relative to a scan synchronization signal in said second scanning direction.

10. The system of claim 9 wherein said stress wave propagating means is transparent and said light emitting means is disposed to emit light through said propagating means, said system including:
 a first sheet of transparent polarized material disposed intermediate said propagating means and said light emitting means and having a polarization axis disposed linearly polarize light passing therethrough in a first polarization direction;
 a second sheet of transparent polarized material disposed in the path of light passing through said first sheet and said propagating means and having a polarization axis disposed perpendicular to said polarization axis of said first sheet.

11. The system of claim 9 wherein said stress wave propagating means comprises a surface wave propagating medium and wherein said initiating means initiates the propagation of surface waves along a planar surface of said medium, said planar surface of said medium along which said surface waves are propagated being light reflective over at least the area of said viewing plane, said light emitting means being disposed to emit light parallel to said planar surface of said medium in spaced relation thereto so that said emitted light is reflected away from said surface by said propagated surface waves.

12. The system of claim 8 wherein said intensity modulating means comprises:
 means for sampling the video signal to provide a series of modulated pulses defining the intensity modulation of the video signal along scan lines in said second scanning direction; and,
 means for sequentially applying said modulated pulses to said individually controllable light sources to selectively scan and intensity modulate said sources.

13. The system of claim 12 wherein said stress wave propagating means is transparent and said light emitting means is disposed to emit light through said propagating means, said system including:
 a first sheet of transparent polarized material disposed intermediate said propagating means and said light emitting means and having a polarization axis disposed to linearly polarize light passing therethrough in a first polarization direction; and,
 a second sheet of transparent polarized material disposed in the path of light passing through said first sheet and said propagating means and having a polarization axis disposed perpendicular to said polarization axis of said first sheet.

14. The system of claim 12 wherein said stress wave propagating means comprises a surface wave propagating medium and wherein said initiating means initiates the propagation of surface waves along a planar surface of said medium, said planar surface of said medium along which said surface waves are propagated being light reflective over at least the area of said viewing plane, said light emitting means being disposed to emit light parallel to said planar surface of said medium in spaced relation thereto so that said emitted light strikes said propagated surface waves and is reflected away from said planar surface by said propagated surface waves.

15. The system of claim 8 wherein said intensity modulating means comprises:
  means for sampling the video signal to provide a series of modulated pulses defining the intensity modulation of the video signal along scan lines in said second direction;
  first means for storing a plurality of said modulated pulses defining one scan line of video information in said second scanning direction; and,
  second means for periodically applying said stored plurality of modulated pulses to said light sources to emit intensity modulated light therefrom along an entire scan line in said second scanning direction simultaneously with the storing in said first means of a plurality of said modulated pulses defining the succeeding line of video information in said second scanning direction.

16. The system of claim 15 wherein said stress wave propagating means is transparent and said light emitting means is disposed to emit light through said propagating means, said system including:
  a first sheet of transparent polarized material disposed intermediate said propagating means and said light emitting means and having a polarization axis disposed to linearly polarize light passing therethrough in a first polarization direction corresponding to one of said first and second scanning directions; and,
  a second sheet of transparent polarized material disposed in the path of light passing through said first sheet and said propagating means and having a polarization axis disposed perpendicular to said polarization axis of said first sheet.

17. The system of claim 15 wherein said stress wave propagating means comprises a surface wave propagating medium and wherein said initiating means initiates the propagation of surface waves along a planar surface of said medium, said planar surface of said medium along which said surface waves are propagated being light reflective over at least the area of said viewing plane, said light emitting means being disposed to emit light parallel to said planar surface of said medium in spaced relation thereto so that said emitted light strikes said propagated surface waves and is reflected away from said planar surface by said propagated surface waves.

18. A video display system comprising:
  a surface wave propagating medium having a substantially planar surface defining a viewing plane;
  means for initiating the propagation of surface waves along said planar surface of said medium in a first scanning direction, the physical characteristics of said medium being such that a propagated surface wave traverses said viewing plane during a scanning synchronization interval in said first scanning direction; and,
  a plurality of light sources disposed to emit light at discrete positions spaced along a scan line in a second scanning direction generally perpendicular to said first scanning direction, said light sources being individually controllable to emit light modulated by a video signal incident upon said propagated surface wave over the extent of said viewing plane.

19. A method of scanning a viewing area in two orthogonal directions comprising the steps of:
  generating first and second signals related to a desired scanning pattern in one and the other of said scanning directions, respectively;
  initiating the propagation of a stress wave in a stress wave propagating material in one of the scanning directions in response to the first scanning signal;
  emitting light incident upon the propagated stress wave at spaced locations along a scan line in the other of the scanning directions, the emitted light being controlled in intensity in accordance with a video signal and the second scanning signal so that the emitted light incident upon the propagated stress wave is video modulated in intensity and scanned in the other of the scanning directions while the stress wave propagates in the one of the scanning directions.

* * * * *